(No Model.)

E. HULL.
FOLDING SOAP DISH.

No. 331,062. Patented Nov. 24, 1885.

WITNESSES:
L. Cook.
C. Sedgwick.

INVENTOR:
E. Hull
BY Munn & Co
ATTORNEYS.

N. PETERS, Photo-Lithographer, Washington, D. C.

UNITED STATES PATENT OFFICE.

ELIZABETH HULL, OF NEW YORK, N. Y.

FOLDING SOAP-DISH.

SPECIFICATION forming part of Letters Patent No. 331,062, dated November 24, 1885.

Application filed December 9, 1884. Serial No. 149,861. (No model.)

*To all whom it may concern:*

Be it known that I, ELIZABETH HULL, of the city, county, and State of New York, have invented a new and Improved Folding Soap-Dish, of which the following is a full, clear, and exact description.

My invention consists, principally, of a folding soap-dish, and of the special construction thereof, all as hereinafter described and claimed.

Reference is to be had to the accompanying drawings, forming part of this specification, in which similar letters of reference indicate corresponding parts in all the figures.

Figure 1:
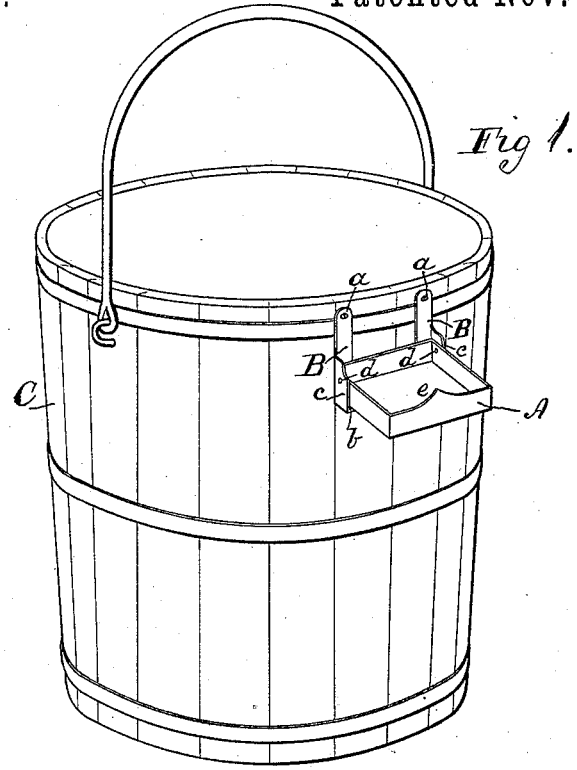
Figure 3:
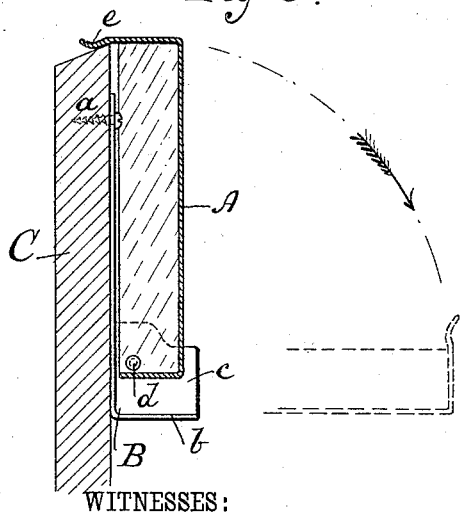
Figure 2:
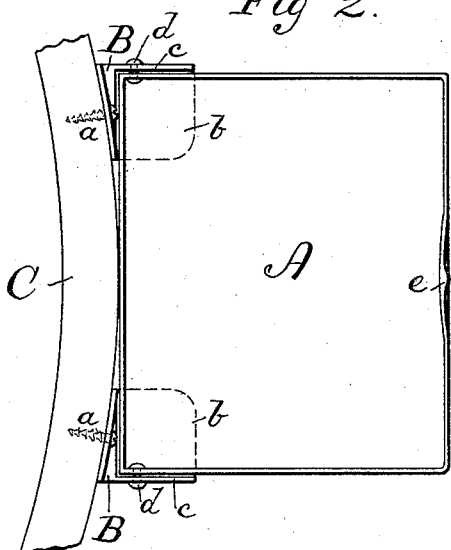

Figure 1 is a perspective view of a scrub-bucket having my invention applied thereto, showing the soap-dish tipped down. Fig. 2 is a plan view of the soap-dish and a portion of a bucket; and Fig. 3 is a sectional elevation of the bucket and soap-dish, showing the dish folded up against the side of the bucket.

The soap-dish A is hinged to the back or attaching-plates B, by which latter the dish may be attached to the bucket C or other object by the screws $a$, or by other fastenings. The plates B might be made together of a single piece of metal; but I prefer to make them separate from each other, and to form or provide each of them at its lower end with a bottom plate, $b$, and side flange, $c$, through which latter the pivot-pins $d$ pass for hinging the dish A to the plates B. The dish A is by preference made of metal, and formed with the slightly inwardly-projecting lip $e$, which has a spring action for clasping the upper edge of the bucket C, for holding the dish in vertical or folded position, as shown in Fig. 3. The flanges $b$ serve to hold or support the dish A in horizontal position, as will be understood from Figs. 1 and 2.

Constructed as described, the device is very convenient and cheap, and may be used in various situations, so that when the dish is folded it will be almost entirely out of the way.

Having thus described my invention, I claim as new and desire to secure by Letters Patent—

1. The combination, with the bucket C, of the soap-dish A, hinged to the plates B, secured to the side of the bucket, substantially as described.

2. The soap-dish A, pivoted at two of its corners to two separate plates, B, substantially as described.

3. The plates B, formed with the side flanges, $c$, and lower horizontal flanges, $b$, in combination with the dish A, pivoted to and between the flanges $c$, substantially as described.

4. The dish A, formed with the inwardly-projecting lip $e$, and pivoted to the plates B, in combination with the bucket C, to which the plates B are attached, the lip $e$ serving to hold the dish A in vertical position, substantially as described.

ELIZABETH HULL.

Witnesses:
SAMUEL G. HULL,
GEORGE A. HULL.